No. 769,642. PATENTED SEPT. 6, 1904.
L. THORNBURG.
METHOD OF DRAWING GLASS.
APPLICATION FILED APR. 27, 1903.
NO MODEL.
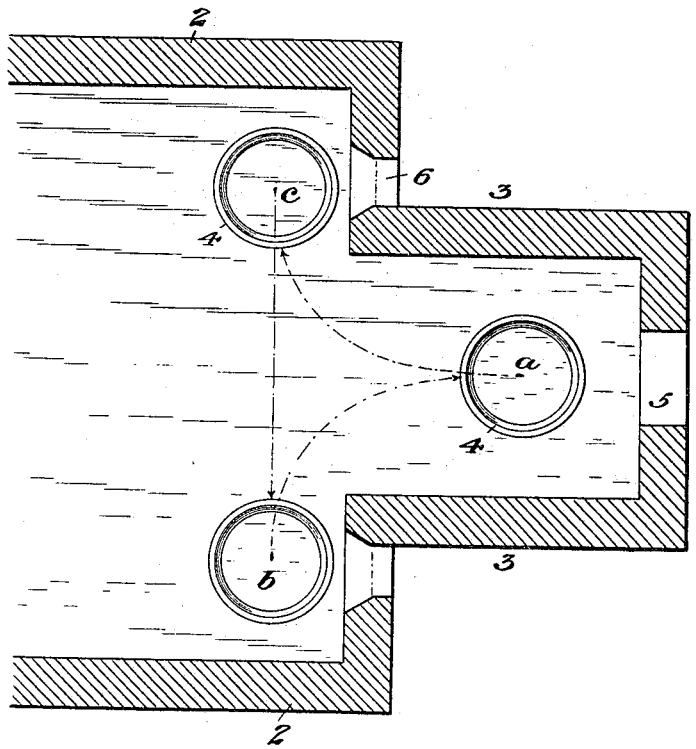
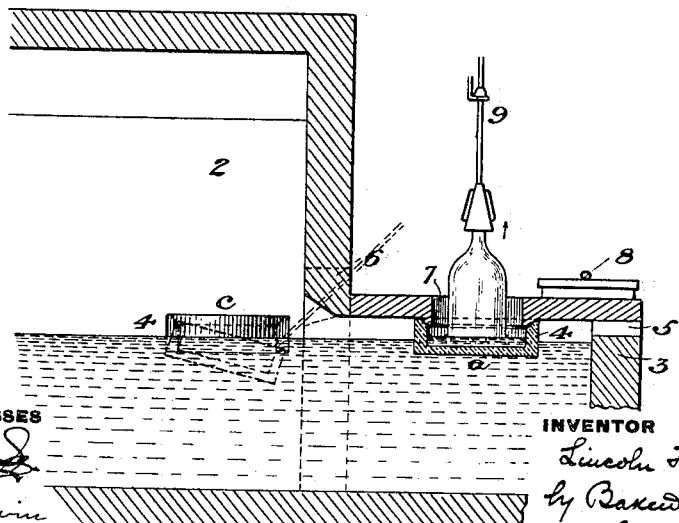

No. 769,642.

Patented September 6, 1904.

UNITED STATES PATENT OFFICE.

LINCOLN THORNBURG, OF GAS CITY, INDIANA, ASSIGNOR TO THE WINDOW GLASS MACHINE COMPANY, OF PITTSBURG, PENNSYLVANIA, A CORPORATION OF NEW JERSEY.

METHOD OF DRAWING GLASS.

SPECIFICATION forming part of Letters Patent No. 769,642, dated September 6, 1904.

Application filed April 27, 1903. Serial No. 154,588. (No model.)

*To all whom it may concern:*

Be it known that I, LINCOLN THORNBURG, of Gas City, Grant county, Indiana, have invented a new and useful Method of Drawing Glass, of which the following is a full, clear, and exact description, reference being had to the accompanying drawings, forming part of this specification, in which—

Figure 1 is a horizontal section showing a portion of a tank-furnace arranged for carrying out my improved method; and Fig. 2 is a side elevation of the same, showing the drawing apparatus.

My invention relates to the drawing of glass articles from a bath, and is designed to afford a new method by which articles may be drawn successively from successive pots floating in the bath.

The invention is designed to avoid the ladling of glass from the tank to a separate drawing-pot and enable the article to be drawn from the pot floating in the tank or in an extension of such tank.

Referring to the accompanying drawings, 2 represents the side wall of the tank-furnace, and 3 a forehearth extension projecting from it, the glass lying at the same level in the forehearth as in the tank. With this forehearth I employ a series of floating pots 4, of refractory material, which are open at the top and closed at the bottom. These pots float in the glass, and the cylinder or other article are drawn successively from successive pots. I prefer to use about three of these pots, so that while the pot *a* is within the forehearth and an article is being drawn therefrom another pot, *c*, from which an article has been drawn, will be within the tank adjacent to the forehearth-opening, where the heat of the chamber will act upon the chilled glass in the pot and bring it to the proper condition. At the same time the third pot, *b*, will be resting at the opposite side of the forehearth-opening ready for drawing into the forehearth when the pot *a* is pushed back into the tank. After the drawing from the pot *a* has been finished it is pushed into the tank by suitable tools inserted through the opening 5 in the outer end of the forehearth, and the pot *b* is then tilted, so as to dip up a quantity of glass from which the next article is to be drawn. This may be done by hooks or other tools inserted through the opening 6 in the side wall of the tank or in any other desirable manner. After the pot is thus replenished with glass from the bath in the tank it is drawn out into the forehearth and brought into direct registering position with the drawing-opening 7 in the top of the forehearth. This opening is preferably beveled at the lowered end to engage the inwardly-beveled edge of the pot, which should be held in place by the static pressure of the bath. A cover 8 is provided for the drawing-opening to prevent radiation of heat when the pot is not in use.

The drawing apparatus shown at 9 may be of any desirable form arranged to draw the article upwardly from within the pot.

The advantages of my invention result from doing away with the feeding of the glass from the tank into a separate pot or receptacle, thereby avoiding loss due to ladling or feeding and also the labor necessary for this purpose. The heat in the tank-chamber melts down the remaining glass in the pot after drawing, and the glass in the pot may be skimmed, if desired, before or after dipping in the fresh glass and before drawing this pot into the forehearth.

The drawing may be done from the tank through holes in its top, the pots floating in the main body of glass, and many other changes may be made in the apparatus without departing from my invention.

I claim—

1. The method of forming glass articles consisting in drawing successive articles upwardly from a series of floating pots in a glass-bath, and reheating and supplying fresh glass to each pot between successive drawing operations; substantially as described.

2. The method of drawing glass consisting in drawing successive articles from a series of floating pots in a glass-bath and reheating and dipping fresh glass into each pot between successive drawing operations therein; substantially as described.

3. The method of drawing glass, consisting in moving a floating pot in a bath of glass into a forehearth extension, cutting off the heat from the drawing-point, drawing an article upwardly from the bath within the pot, then moving the pot back into the main bath, and moving another pot into the forehearth extension; substantially as described.

4. The method of drawing glass, consisting in dipping the glass into a pot with a closed bottom floating on the bath, drawing an article upwardly from the separate portion of glass in the pot, and then dipping fresh glass into the floating pot; substantially as described.

In testimony whereof I have hereunto set my hand.

LINCOLN ×̲ THORNBURG.
(his mark)

Witnesses:
 JOHN MILLER,
 H. M. CORWIN.